(12) United States Patent
Salter et al.

(10) Patent No.: US 10,099,606 B2
(45) Date of Patent: Oct. 16, 2018

(54) DOME LIGHT ASSEMBLIES AND UNITS THAT PRODUCE NATURAL AND COURTESY LIGHT PATTERNS

(71) Applicant: Ford Global Technologies, LLC, Dearborn, MI (US)

(72) Inventors: Stuart C. Salter, White Lake, MI (US); James J. Surman, Clinton Township, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 129 days.

(21) Appl. No.: 15/171,620

(22) Filed: Jun. 2, 2016

(65) Prior Publication Data
US 2017/0349094 A1 Dec. 7, 2017

(51) Int. Cl.
| | |
|---|---|
| *B60Q 1/00* | (2006.01) |
| *B60Q 3/20* | (2017.01) |
| *F21V 3/06* | (2018.01) |
| *F21K 9/237* | (2016.01) |
| *F21S 10/00* | (2006.01) |
| *F21V 3/02* | (2006.01) |
| *F21V 7/22* | (2018.01) |
| *H05B 33/08* | (2006.01) |

(Continued)

(52) U.S. Cl.
CPC .............. *B60Q 3/20* (2017.02); *B60Q 1/00* (2013.01); *F21K 9/237* (2016.08); *F21S 10/00* (2013.01); *F21V 3/02* (2013.01); *F21V 3/0625* (2018.02); *F21V 7/22* (2013.01); *H05B 33/086* (2013.01); *H05B 33/0854* (2013.01); *H05B 37/0218* (2013.01); *F21Y 2101/00* (2013.01)

(58) Field of Classification Search
CPC .... B60Q 3/20; B60Q 3/30; B60Q 3/40; F21K 9/237; F21S 10/00; F21V 3/0445; F21Y 2101/00; H05B 33/0858
See application file for complete search history.

(56) References Cited

U.S. PATENT DOCUMENTS

| | | | |
|---|---|---|---|
| 5,060,118 A | 10/1991 | Penrod et al. | |
| 6,019,411 A * | 2/2000 | Carter | ............... B32B 17/10036 296/215 |
| 6,132,072 A | 10/2000 | Turnbull et al. | |

(Continued)

FOREIGN PATENT DOCUMENTS

| | | |
|---|---|---|
| CN | 202345586 U | 7/2012 |
| CN | 102881230 A | 1/2013 |

(Continued)

*Primary Examiner* — Ali Alavi
(74) *Attorney, Agent, or Firm* — Vichit Chea; Price Heneveld LLP (57) ABSTRACT

A dome light assembly that includes a reflective surface facing an interior; a light-diffusing element over the reflective surface having a plurality of corresponding opposed edges and LED sources; and a controller for directing the sources to transmit a plurality of light patterns from the element into the interior based at least in part on a plurality of inputs. Further, each source is configured to direct incident light into the corresponding edge. These light patterns include natural light and other light patterns. The inputs include manual inputs, weather inputs, exterior light sensor inputs, temporal inputs and global positioning system inputs.

20 Claims, 9 Drawing Sheets

(51) Int. Cl.
*H05B 37/02* (2006.01)
*F21Y 101/00* (2016.01)

(56) References Cited

U.S. PATENT DOCUMENTS

| | | | |
|---|---|---|---|
| 6,322,225 | B1 | 11/2001 | Koike |
| 6,631,575 | B1 | 10/2003 | Voelzke et al. |
| 6,666,571 | B2 * | 12/2003 | Becher ................ B60J 7/00 362/490 |
| 6,829,852 | B1 | 12/2004 | Uehran |
| 2004/0185195 | A1 * | 9/2004 | Anderson ......... B32B 17/10036 428/34 |
| 2007/0115673 | A1 | 5/2007 | Chen et al. |
| 2009/0251917 | A1 | 10/2009 | Wollner et al. |
| 2011/0267833 | A1 | 11/2011 | Verrat-Debailleul et al. |
| 2011/0308693 | A1 | 12/2011 | Van Nutt et al. |
| 2012/0217881 | A1 * | 8/2012 | Sethi ................ G02B 6/0068 315/155 |
| 2012/0320621 | A1 | 12/2012 | Kleo et al. |
| 2014/0096893 | A1 | 4/2014 | Veerasamy |
| 2014/0098557 | A1 | 4/2014 | Veerasamy |
| 2014/0293644 | A1 * | 10/2014 | Levinson ............... G09F 13/18 362/604 |
| 2015/0016132 | A1 | 1/2015 | Verrat-Debailleul |

FOREIGN PATENT DOCUMENTS

| | | |
|---|---|---|
| DE | 10343778 A1 | 5/2004 |
| EP | 1903359 A2 | 3/2008 |
| EP | 2003393 B1 | 5/2012 |
| WO | 2007077099 A1 | 7/2007 |

* cited by examiner

DOME LIGHT ASSEMBLIES AND UNITS THAT PRODUCE NATURAL AND COURTESY LIGHT PATTERNS

FIELD OF THE INVENTION

The present invention generally relates to LED-based interior lighting assemblies with natural and courtesy light pattern-producing capabilities, particularly such lighting assemblies configured within the roof of a vehicle for vehicle-related applications.

BACKGROUND OF THE INVENTION

Vehicular interior lighting, e.g., dome lights, courtesy lights, glove box lights, foot-well lights, and other roof and side panel interior lighting, has generally been realized through the application of conventional, incandescent lighting sources for the past few decades. Although the light produced from incandescent sources is fairly uniform, it is generally accompanied by relatively high heat levels and low intensity compared to more modern light sources (e.g., light-emitting diode, fluorescent, etc.). Further, incandescent light sources have relatively high energy usage compared to more modern light sources.

In the past decade, light emitting diode (LED) sources have been employed in various lighting applications, including vehicular applications. LED sources possess many advantages over conventional lighting sources including the ability to transmit high intensity light patterns and generate low heat upon light transmission with very low energy usage. One drawback of LED sources is that the light produced from them is directional and can result in high-contrast illumination, shadowing and other undesirable effects associated with highly directional light. Consequently, in the context of vehicular interior lighting, LED sources have been difficult to use given that the directional nature of the light output from these sources has led to high contrast within the close quarters of the vehicle interior.

Some success has been realized in overcoming the directional nature of the light output from LED sources by coupling certain optics to them. In particular, near-field lens elements, collimators, light-diffusers and reflectors have been coupled to LED sources to shape their light output into uniform patterns approximating those produced by incandescent sources. Unfortunately, many of these solutions require additional packaging (e.g., larger overall lighting source dimensions) that can significantly add cost; consequently, LED sources are not prevalent in vehicular interiors, particularly as replacements to low-cost courtesy and dome lights.

Consumers are also increasingly demanding access to natural lighting within vehicles, residences, offices and other interiors. In vehicles, natural lighting that supplements the natural light transmitted through side windows, windshields, and rear windows is often provided through sun roofs, moon roofs and other non-traditional windows. Many consumers, however, find significant drawbacks associated with these supplemental natural light access points including the loss of interior space associated with the motors and elements needed for these natural light access points, maintenance and reliability concerns associated with their moving parts, and potential increased water leakage through them upon premature failure of their elements. Another drawback associated with moon roofs and sun roofs is that these elements reduce the amount of space available in the roof of the vehicle for dome and courtesy lighting.

Accordingly, there is a need for vehicular interior lighting solutions that can employ LED sources in a low-cost fashion, with minimal packaging constraints and at low manufacturing costs. Further, as LED sources continue to be integrated within the vehicle industry, there is a desire by many consumers for unique lighting aesthetics that cannot be achieved through conventional sources, including supplemental natural lighting for the interior of the vehicle.

SUMMARY OF THE INVENTION

One aspect of the present invention is to provide a dome light assembly that includes a reflective surface facing an interior; a light-diffusing element over the reflective surface having a plurality of corresponding opposed edges and LED sources; and a controller for directing the sources to transmit a natural light pattern from the element into the interior based at least in part on an environmental input. Further, each source is configured to direct incident light into the corresponding edge.

Another aspect of the present invention is to provide a dome light assembly that includes a reflective surface facing an interior; a light-diffusing element over the reflective surface having a plurality of corresponding opposed edges and LED sources; and a controller for directing the sources to transmit light patterns from the element at a plurality of locations within the interior. Further, each source is configured to direct incident light into the corresponding edge.

A further aspect of the present invention is to provide a dome light assembly that includes a reflective surface facing an interior; a light-diffusing element over the reflective surface having a plurality of corresponding opposed edges and LED sources; and a controller for directing the sources to transmit a plurality of light patterns from the element into the interior based at least in part on a plurality of inputs. Further, each source is configured to direct incident light into the corresponding edge.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
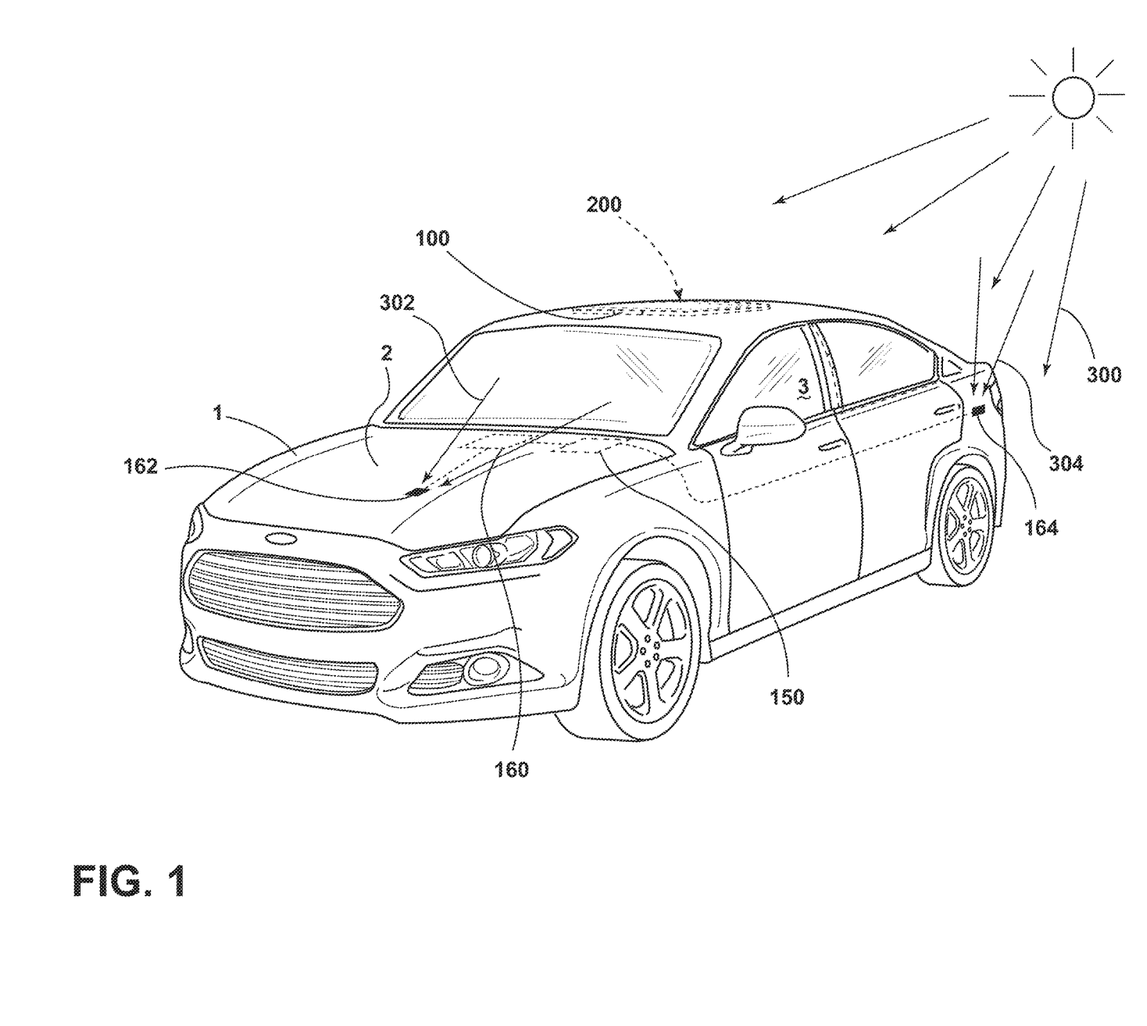
FIG. 1 is an end-on, perspective view of a vehicle containing one or more dome light assemblies according to an embodiment.
Figure 3:
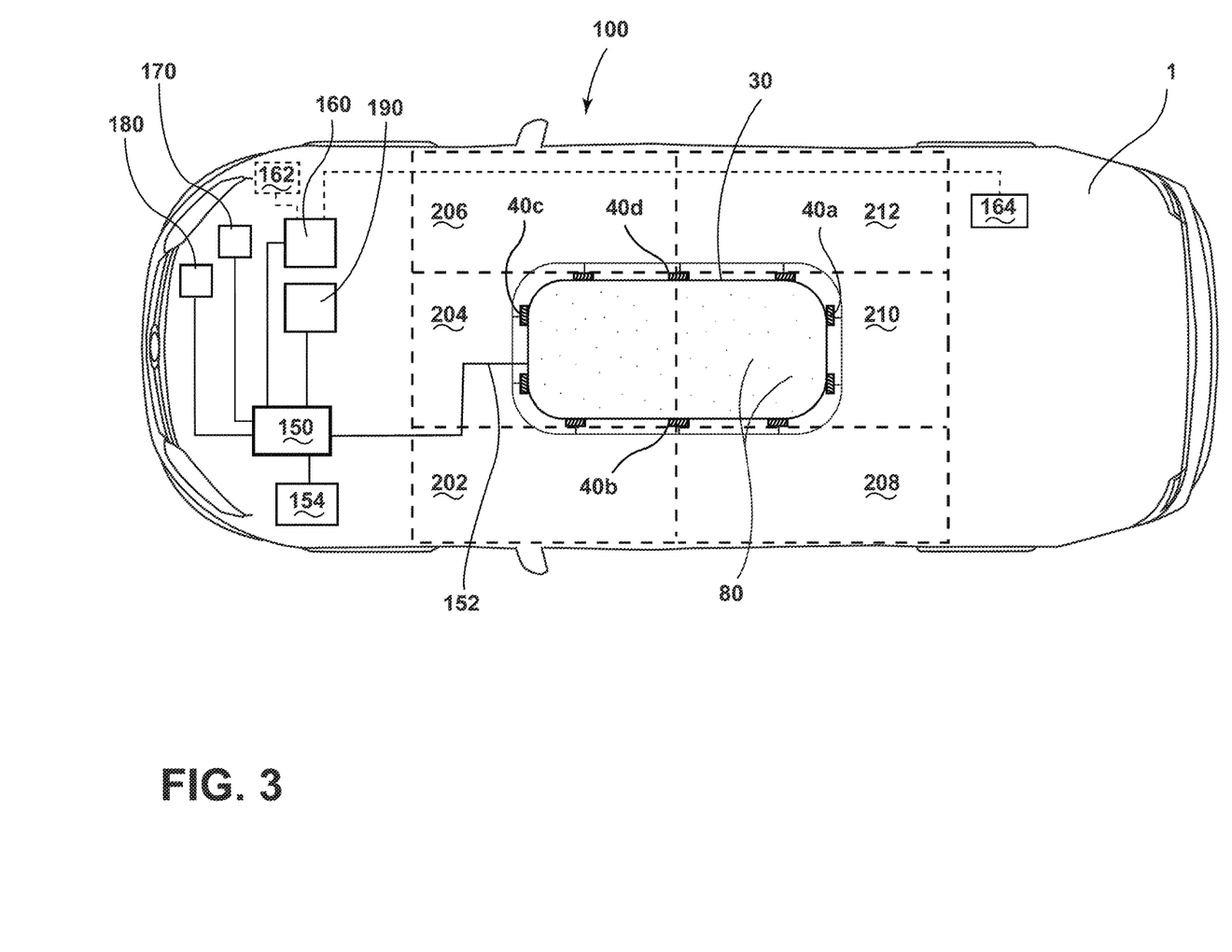
FIG. 3 is a top-down, schematic plan view of the dome light assembly depicted in FIG. 2.

For purposes of description herein, the terms "upper," "lower," "right," "left," "rear," "front," "vertical," "horizontal," "interior," "exterior," "vehicle forward," "vehicle rearward" and derivatives thereof shall relate to the invention as oriented in FIGS. 1 and 3. However, the invention may assume various alternative orientations, except where expressly specified to the contrary. Also, the specific devices and assemblies illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Certain recitations contained herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

LED signal assemblies are being employed today with great practical effect. In the automotive industry, many vehicles now utilize LED-based lighting assemblies, generally in exterior applications (e.g., daytime running lights (DRLs)). Further, these LED-based vehicular assemblies can rely on one or multiple LED light sources, each inherently producing high light intensity with small beam angles. Accordingly, many LED-based lighting assemblies produce "hot spots" of discrete light associated with each LED light source.

Similarly, the high-efficiency and intensity aspects of LED sources open up greater possibilities for creating light patterns that mimic natural lighting. Given the small beam angles of LED sources, conventional approaches to mimicking natural lighting through the use of LED sources generally rely on sophisticated optics, lenses and high quantities of LED light sources. Further, these LED-based approaches to simulating natural lighting have been costly.

What has not been previously understood is how to configure and design LED-based vehicular lighting assemblies to produce highly uniform light for vehicular interior applications, including dome light assemblies, panel light assemblies and other compact, illuminated assemblies. As outlined in this disclosure, dome light assemblies are provided that employ LED sources with minimal packaging constraints and at low manufacturing costs. These dome light assemblies and similar lighting assemblies can be installed in the interior of vehicles, residences, dwellings and other structures within roof, wall and other panel elements. These light assemblies can produce various courtesy lighting patterns within the interior of vehicles and other structures housing these assemblies. Further, these light assemblies and similar light assemblies in the disclosure can produce natural light patterns with desirable aesthetics at a relatively low cost to simulate sun light and other ambient lighting exterior to the vehicle or other structure containing these light assemblies.

Figure 4:
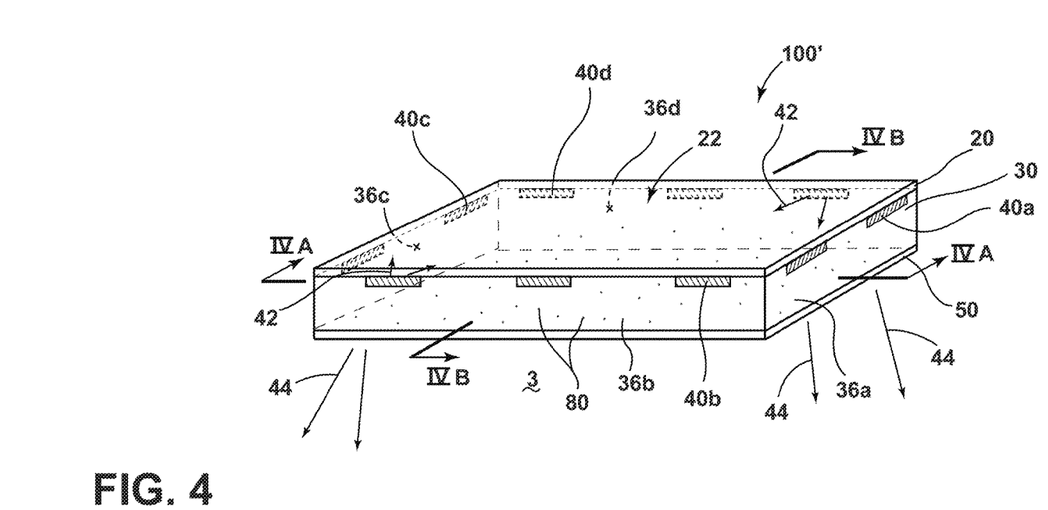
FIG. 4 is a perspective view of a light assembly unit employing a plurality of LED sources and a light-diffusing element according to an embodiment.
Figure 4A:
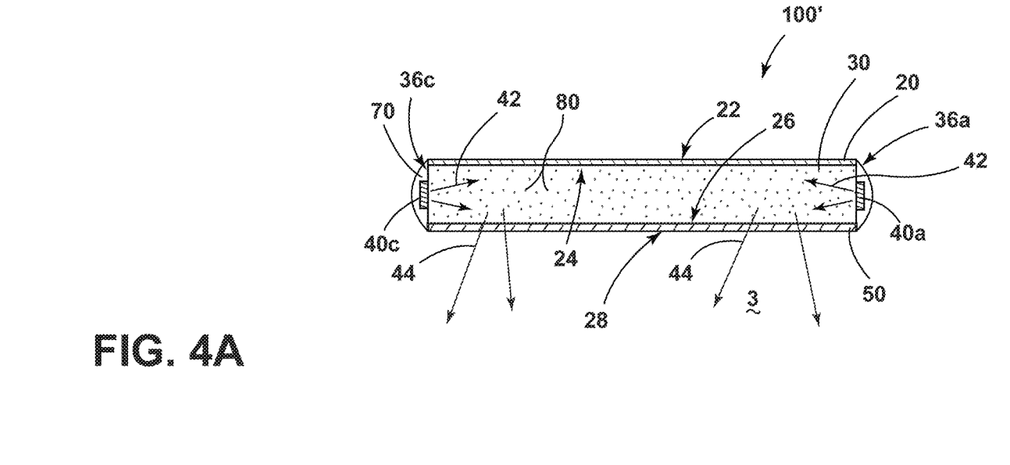
FIG. 4A is a cross-sectional view through the width of the light assembly unit depicted in FIG. 4.
Figure 4B:
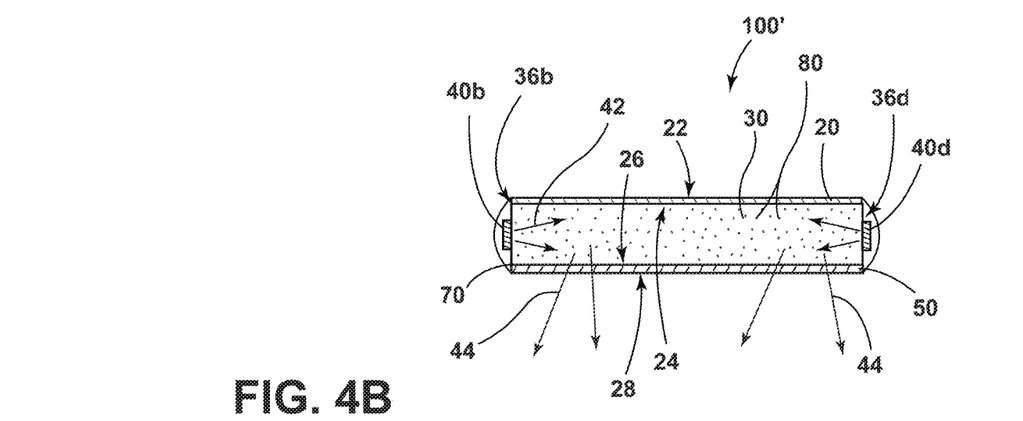
FIG. 4B is a cross-sectional view through the length of the light assembly unit depicted in FIG. 4.

Referring to FIG. 1, a vehicle 1 is depicted with dome light assembly 100 as integrated within a roof 200. The dome light assembly 100 can be installed within the roof 200 of the vehicle 1 with packaging having a significantly smaller footprint than other features, e.g., a sun roof or moon roof, that allow for direct transmission of ambient light from an exterior 3 of the vehicle 1 to its interior 2. According to some aspects of the disclosure, when the dome light assembly 100 is activated by a controller 150, it can transmit a diffuse light pattern into the interior 3 of the vehicle 1 from one or more LED sources of the plurality of LED sources (e.g., LED sources 40a-40d as shown in FIG. 3) contained within, or otherwise coupled to, the assemblies that provide a courtesy light function for one or more occupants of the vehicle 1. The light patterns produced and transmitted from the dome light assembly 100 emanate from the light-diffusing element (e.g., light-diffusing element 30 as shown in FIG. 4) within the assemblies themselves. Further, the controller 150 can activate one or more of the LED sources of the light assembly to produce light patterns that are directed to various regions within the interior 3 of the vehicle 1 (e.g., regions 202, 204, 206, 208, 210 and 212 as shown in FIG. 3).

Referring again to FIG. 1, the dome light assembly 100 can also function, in certain aspects, to provide natural light patterns within the interior 3 of the vehicle 1 that mimic or otherwise simulate ambient light on the exterior 2 of the vehicle 1, such as sunlight 300. More particularly, the controller 150 can transmit these natural light patterns based at least in part on one or more environmental inputs 160 (see also FIGS. 2, 3) to simulate ambient light, such as sunlight 300. In certain embodiments, the controller 150 of the dome light assembly 100 can produce these natural light patterns based at least in part on environmental inputs 160 obtained from light sensors, such as light sensors 162, 164 situated at various locations on the exterior 2 of the vehicle 1 that receive direct sunlight patterns 302, 304, respectively. Further, the controller 150 can activate one or more of the LED sources (e.g., LED sources 40a-40d as shown in FIG. 3) to direct particular natural light patterns to various regions within the interior 3 of the vehicle 1 to simulate, for example, direct sunlight patterns 302, 304 that fall on various portions of the exterior 2 of the vehicle 1. For instance, the controller 150 could increase the intensity of a natural light pattern emanating from a dome light assembly 100 into the right-hand, front portion 206 (see FIG. 3) of the interior 3 of the vehicle 1 based at least in part on the receipt of a higher intensity direct sunlight pattern 304 falling on the sensor 164, located on the driver-side, vehicle rear panel of the vehicle 1. Such a natural light pattern produced by the dome light assembly 100 would, in effect, simulate the direct sunlight pattern 304 that might otherwise be transmitted into the right-hand, front portion 206 through a sun roof or moon roof installed in the roof 200 of the vehicle 1.

Still referring to FIG. 1, the dome light assembly 100 can also be configured, in certain embodiments, to provide vehicle-related light patterns within the interior 3 of the vehicle 1 to signal the driver and/or passengers within the vehicle 1 of certain vehicle-related indications. These vehicle-related indications can include collision warnings, emergency stop indications, hazard lights, low fuel, low tire pressure, engine warnings, another vehicle or object in a blind spot, another vehicle or object in close proximity to the vehicle, and other vehicle-related signals. More particularly, the controller 150 can transmit the vehicle-related light patterns based at least in part on one or more vehicular inputs 180 (see FIGS. 2, 3) derived from vehicle sensors arrayed throughout the vehicle 1 and/or signals also received by other indicator elements within the vehicle 1 (e.g., the dashboard). Further, the controller 150 can activate one or more of the LED sources (e.g., LED sources 40a-40d as shown in FIG. 4) to direct particular vehicle-related light patterns to various regions within the interior 3 of the vehicle 1 for particular signaling effects. For example, the controller 150 could activate particular LED sources in the dome light assembly 100 to indicate to the driver and/or occupants of the vehicle 1 that the vehicle is in close proximity to an object closest to one or more of regions 202, 204, 206, 208, 210 and 212 (see FIG. 3). In addition, the vehicle-related light patterns from the dome light assembly 100 can be configured to augment or otherwise enhance signal indications provided by other elements of the vehicle 1, e.g., indicator elements in the dashboard. For example, low fuel warnings provided by the dome light assembly 100 could be configured as a fail-safe mechanism in the event that the driver fails to respond to other low fuel indications provided in the dashboard of the vehicle 1.

Figure 2:
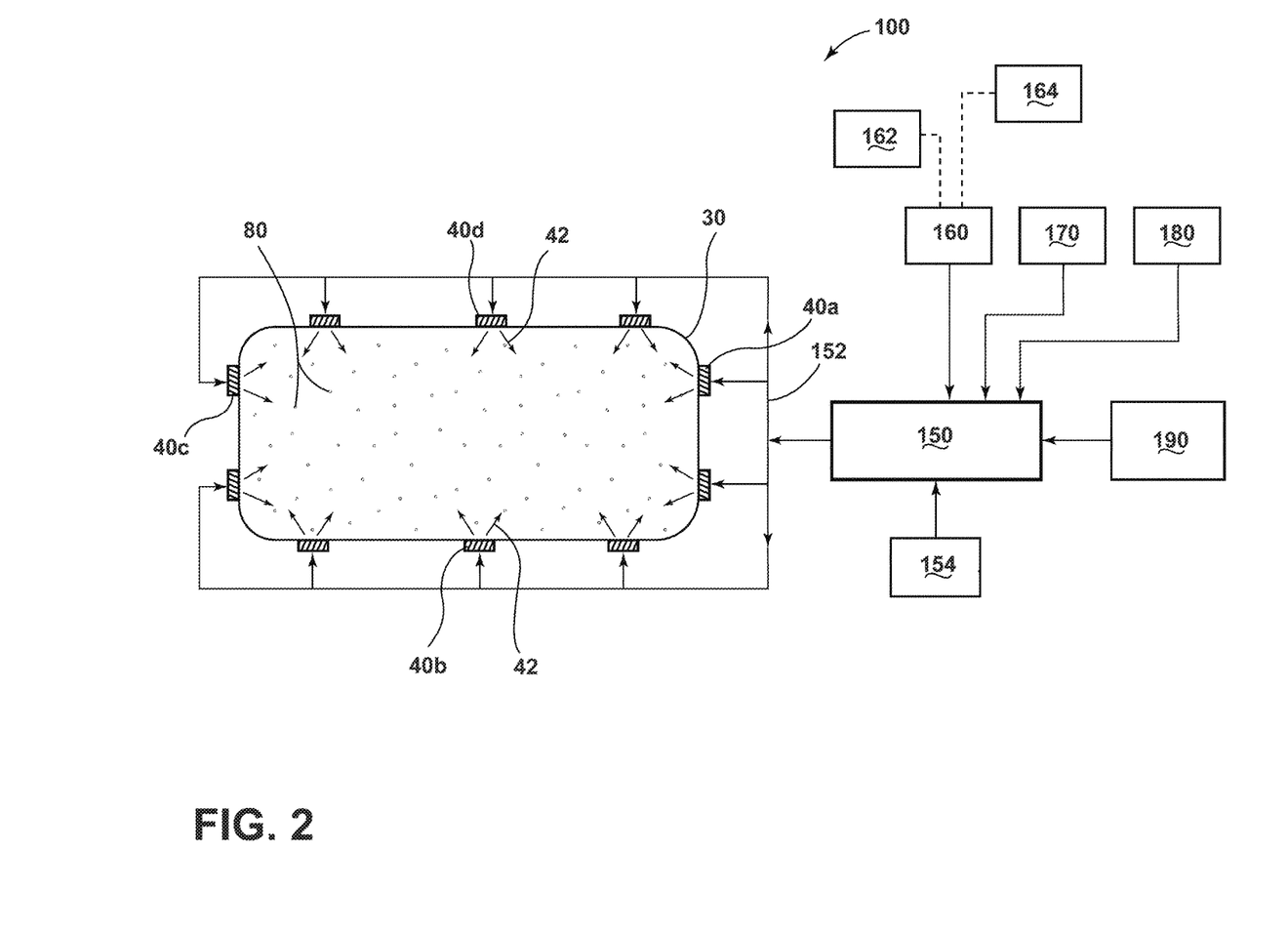
FIG. 2 is a schematic view of a dome light assembly according to an embodiment.

Referring now to FIGS. 2 and 3, schematic views depict the dome light assembly 100 of the disclosure in further detail. As shown in these figures, dome light assembly 100 includes a light-diffusing element 30 having a plurality of LED sources 40a, 40b, 40c and 40d; and a controller 150 coupled to the LED sources 40a-d via wiring 152. These LED sources 40a-d are configured within the light assembly 100 to direct incident light 42 into the light-diffusing element 30. Further, the controller 150 of the assembly 100 can be configured to direct one or more of the LED sources 40a-d to transmit light patterns (e.g., light patterns 44 as shown in FIG. 4 emanating from the light assembly unit 100') from the light-diffusing element 30 into the interior 3 of the vehicle 1 (see FIG. 1) based at least in part on one or more inputs. It should be understood that these light patterns (e.g., light patterns 44 as shown in FIG. 4) are derived from the incident light 42 that scatters off of, for example, scattering sites 80 located within the light-diffusing element 30. Further, the inputs of the controller 150 include environmental inputs 160, manual inputs 170, vehicle-related inputs 180, and user program-related inputs 190. As also shown in FIGS. 2 and 3, the controller 150 can be coupled to a power source 154 in some implementations and, in other aspects, power can be derived from a source within the controller 150 or other component (not shown) within the vehicle 1.

With regard to the environmental input 160 coupled to the controller 150 of the dome light assembly 100 schematically depicted in FIGS. 2 and 3, in some embodiments the environmental input can be sunlight 300 or other ambient light on the exterior 2 of the vehicle 1 (see FIG. 1). The environmental input 160 can also be sunlight 300 that falls on various exterior portions of the vehicle 1, as captured by various light sensors, e.g., light sensors 162, 164, arrayed on various exterior portions of the vehicle 1. In such implementations, the dome light assembly 100 can be configured such that its controller 150 directs one or more of the LED sources 40a-40d to direct particular natural light patterns to various regions within the interior 3 of the vehicle 1 to simulate, for example, direct sunlight patterns 302, 304 (see FIG. 1) that fall on various portions of the exterior 2 of the vehicle 1. For example, the controller 150 could activate certain of the LED sources 40a-40d in the dome light assembly 100 to generate incident light 42 within the light-diffusing element 30 to produce natural light patterns (e.g., light patterns 44 as shown in FIG. 4) that fall within regions 202, 204, 206, 208, 210 and 212 of the vehicle based at least in part on the environmental input 160. Other environmental inputs 160 that can be employed by the controller 150 include weather inputs, global positioning system (GPS) inputs, time and date inputs (i.e., a temporal input), and moisture inputs.

With regard to the manual and user-program inputs 170 and 190, respectively, coupled to the dome light assembly 100 schematically depicted in FIGS. 2 and 3, these features can be employed at least in part by the controller 150 to direct one or more of the LED sources 40a-40d to direct natural light patterns, courtesy light patterns and/or other light patterns (e.g., light patterns 44 as shown in FIG. 4) within the interior 3 of the vehicle 1. The manual inputs 170 include buttons, knobs, dials, switches, mobile device touchscreen controls (e.g., via a wireless communication protocol with the vehicle 1) and other user inputs that can be manually controlled by occupants of the vehicle 1. The user-program inputs 190 can be accessed via the same buttons, knobs and the like of the user inputs 170 or other controls to store various programs and routines as understood by those with ordinary skill in the field to provide control schemes to the controller 150. For example, the controller 150 can activate one or more of the LED sources 40a-40d in the dome light assembly 100 based at least in part on manual and/or user-program inputs 170 and 190, respectively, to generate incident light 42 within the light-diffusing element 30 to produce natural and/or courtesy light patterns that fall within a selected region or regions 202, 204, 206, 208, 210 and 212 of the interior 3 of the vehicle 1.

With regard to the vehicle-related input 180 coupled to the controller 150 of the dome light assembly 100 schematically depicted in FIGS. 2 and 3, this feature can be employed at least in part by the controller 150 to direct one or more of the LED sources 40a-40d to direct vehicle-related light patterns (e.g., light patterns 44 as shown in FIG. 4) within the interior 3 of the vehicle 1 to signal the driver and/or passengers within the vehicle 1 of certain vehicle-related indications. The vehicle-related inputs 180 include various vehicle indications such as collision warnings, emergency stop indications, hazard lights, low fuel, low tire pressure, engine warnings, another vehicle or object in a blind spot, another vehicle or object in close proximity to the vehicle, and other vehicle-related signals derived from the vehicle 1. More particularly, the controller 150 can transmit the vehicle-related light patterns based at least in part on one or more vehicular inputs 180 derived from vehicle sensors arrayed throughout the vehicle 1 and/or signals also received by other indicator elements within the vehicle 1 (e.g., the dashboard). Further, the controller 150 can activate one or more of the LED sources 40a-40d to direct incident light 42 within the light-diffusing element 30 that, ultimately, generates particular vehicle-related light patterns to various regions within the interior 3 of the vehicle 1 for particular signaling effects. For example, the controller 150 could activate certain of the LED sources 40a-40d in the dome light assembly 100 based at least in part on a vehicle-related input 180 to indicate to the driver and/or occupants of the vehicle 1 that the vehicle is in close proximity to an object closest to one or more of regions 202, 204, 206, 208, 210 and 212.

In another embodiment, the controller 150 of a dome light assembly 100 could also activate certain of the LED sources 40a-40d in the dome light assembly 100 to provide courtesy light patterns to certain of the occupants in the rear portions of the vehicle 1 based at least in part on both manual and vehicle-related inputs 170 and 180, as depicted in FIGS. 2 and 3. More particularly, the controller 150 could partially override a user input 170 intended to direct a courtesy light pattern throughout the interior 3 of the vehicle 1 based on a vehicle-related input 180 indicating that the vehicle 1 is in motion. Upon recognizing that the vehicle 1 is in motion (i.e., based on the vehicle-related input 180), the controller 150 can then direct a courtesy light pattern to only occupants in the rear portion of the vehicle (e.g. regions 208, 210, 212) to prevent excess glare from the dome light assembly 100 from reaching the driver in the front portion of the interior 3 of the vehicle 1.

Figure 4C:
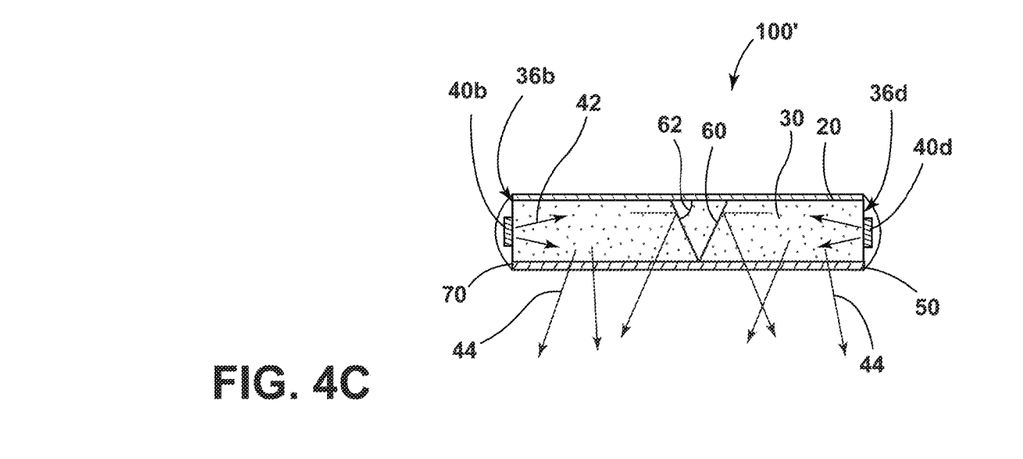
FIG. 4C is a cross-sectional view through the length of the light assembly unit depicted in FIG. 4 with a pair of facets in its light-diffusing element according to a further embodiment.

Referring now to FIGS. 4-4C, a light assembly unit 100' of a dome light assembly 100 is depicted that includes a light barrier 20 with exterior and interior-facing surfaces 22 and 24, respectively. When the dome light assembly 100 is installed in the roof of a vehicle, the exterior-facing surface 22 of the barrier 20 can face an exterior of the vehicle (e.g., an exterior 2 of the vehicle 1 as shown in FIG. 1). The exterior-facing surface 22 of the barrier 20 can also face an exterior of a fixture, element, or other structure containing the light assembly unit 100' of the dome light assembly 100. The interior-facing surface 24 of the barrier 20 faces an interior of the structure (e.g., the interior 3 of the vehicle 1 as shown in FIG. 1) containing the light assembly unit 100'. In some aspects of the light assembly unit 100', the light barrier 20 can be a thin substrate derived from a glass, glass-ceramic, polymeric, steel or composite composition. The light barrier 20 is typically affixed at its exterior-facing surface 22 to a roof 200 of the vehicle 1 (FIG. 1) or other panel of the structure housing the light assembly unit 100' of the dome light assembly 100. Further, the thickness of the light barrier 20 can range from about 0.0075 mm to about 5 cm in certain embodiments. In aspects of the light assembly unit 100' in which the light barrier 20 is essentially a thin layer or film, the light barrier 20 can have a thickness from about 0.0075 mm to about 0.25 mm. In other embodiments, light barrier 20 is in the form of a substrate and can range in thickness from about 1 mm to about 5 cm.

As further depicted in FIGS. 4-4C, the light barrier 20 typically includes a reflective, interior-facing surface 24. Further, the reflective, interior-facing surface 24 in such configurations can include specular or non-specular (e.g., white matte) surfaces, both of which are intended to reflect incident light 42 from the LED sources 40a-40d with high efficiency and little absorption. In some embodiments, the reflective interior-facing surface 24 is mirror-like with high specular reflectivity. For example, the reflective interior-facing surface 24 can be a highly-reflective coating applied through vacuum metallization (e.g., a vacuum-metallized chromium coating from Leonhard Kurz Stiftung & Co. KG ("Kurz")). Functionally, the interior-facing surface 24 of the light barrier 20 can serve to reflect incident light 42 from the LED sources 40a-40d within the light-diffusing element 30. As the interior-facing surface 24 of the light barrier 20 serves to reflect this light within the light-diffusing element 30, little to no light loss from the LED sources 40a-40d occurs through the light barrier 20 into the roof 200 or other structure housing the light assembly unit 100' and the dome light assembly 100.

Still referring to FIGS. 4-4C, the light assembly unit 100' of the dome light assembly 100 further includes a light-diffusing element 30 that is arranged over the light barrier 20. More particularly, the light-diffusing element 30 is disposed over the interior-facing surface 24 of the barrier 20. In certain aspects of the assembly unit 100', the element 30 is a film, coating or layer deposited directly onto the interior-facing surface 24 of the light barrier 20. In other preferred aspects, the element 30 is a layer affixed directly to or spaced from the light barrier 20. More generally, the light-diffusing element 30 has an average thickness that can range from about 0.5 mm to 5 mm. As shown in exemplary form in FIGS. 4-4C, the thickness of the light-diffusing element 30 can be held substantially constant. In other implementations of the dome light assembly 100, however, the thickness of the light-diffusing element 30 employed in the light assembly unit 100' can vary at various locations within the unit 100' (or in a controlled fashion as shown in light assembly units 100a, 100b depicted in FIGS. 5-5C and 6-C).

In some aspects, the light-diffusing element 30 includes various scattering sites 80 randomly dispersed or dispersed according to a predetermined pattern within its thickness. According to one embodiment, the light-diffusing element 30 can be fabricated from an acrylic polymer material containing light-diffusing particles as the scattering sites 80 (e.g., ACRYLITE® LED acrylic sheet from Evonik Cryo LLC). In other aspects, the light-diffusing element 30 includes a matrix of substantially transparent polymeric, glass or glass-polymeric material containing other scattering sites 80 (e.g., voids). These scattering sites 80 can be of similar size, or dissimilar sizes, and at concentrations sufficient to scatter incident light 42 from one or more LED sources 40a-40d within the light-diffusing element 30.

As also depicted in FIGS. 4-4C, the light-diffusing element 30 can be configured in a rectangular shape. More particularly, the element 30 includes first and second opposed edges 36a and 36c and third and fourth opposed edges 36b and 36d, respectively. Further, the light assembly unit 100' includes one or more LED sources 40a, 40b, 40c and 40d configured to direct incident light 42 into corresponding opposed edges 36a, 36b, 36c and 36d, respectively. The incident light 42 travels within the light-diffusing element 30 and scatters off of the scattering sites 80 contained within the element 30. Further, various types of LEDs are suitable for use as the LED sources 40a-40d including, but not limited to, top-emitting LEDs, side-emitting LEDs, and others. The scattered light, which originated from the LED sources 40a-40d, then exits the light-diffusing element 30 as a scattered light pattern 44 into the interior 3 of the structure containing the light assembly unit 100' through the bottom face of the light-diffusing element 30.

Referring again to FIGS. 4-4C, the light-diffusing element 30 can be further defined by a tapered profile in certain embodiments. In certain aspects, the thickness at the first opposed edge 36a of the element 30 is greater than the thickness at the second opposed edge 36c. Consequently, the thickness of light-diffusing element 30 decreases or otherwise tapers according to a continuous or substantially continuous and constant fashion from the first opposed edge 36a to the second opposed edge 36c. The tapered nature of the light-diffusing element 30 serves to significantly improve the uniformity of the scattered light pattern 44 that emanates from the element 30 between the first and second opposed edges 36a, 36c. The smaller thickness of the element 30 at the second opposed edge 36c away from the LED sources 40a (i.e., as compared to the thickness at the first opposed edge 36a) serves to offset the higher degree of light loss associated with the incident light 42 at this location compared to other locations within the element 30. That is, light loss associated with the incident light 42 increases as a function of distance from the LED sources 40a-40d within the light-diffusing element 30, assuming a constant thickness of the element 30. By reducing the thickness of the element 30 along this same path, the degree of light loss can be offset by the thickness reduction, leading to improved uniformity in the scattered light pattern 44 that emanates from the light-diffusing element 30 into the interior 3 of the structure containing the light assembly unit 100'. It should also be understood that the same approach as outlined in the foregoing can be applied to the third and fourth opposed edges 36b and 36d, respectively.

Again referring to FIGS. 4-4C, other aspects of the light assembly unit 100' include a light-diffusing element 30 having a non-continuous or non-constantly changing profile in which the thickness at the first opposed edge 36a is greater than the thickness at the second opposed edge 36c. For example, in one embodiment, the thickness of the element 30 changes in a stepped function between the first and second opposed edges 36a, 36c. In another embodiment, the thickness of the element 30 continuously changes according to a non-linear function between the first and second opposed edges 36a, 36c.

In other aspects of the light assembly unit 100', the thickness of the light-diffusing element 30 can be varied in more than one direction away from the LED sources 40a-40d to obtain a particular light-scattering pattern 44 that emanates from the light-diffusing element 30 into the interior 3 of the structure containing the unit 100' (along with a dome light assembly 100 housing the unit 100'). For example, an application may require more light transmitted toward the rear of the vehicle 1 relative to the location of the light assembly unit 100' employed in the roof 200 (see FIG. 1) to ensure that the rear passengers (e.g., as located in rear portions 208, 210, 212 as shown in FIG. 3) have appropriate lighting without disrupting the driver of the vehicle. One approach to ensuring that the light assembly unit 100' produces such a scattered pattern 44 is to increase the thickness of the portion of the element 30 in the vehicle forward direction relative to the portion of the element in the vehicle rearward direction in which the LED source is mounted on an edge of the element on the passenger or driver side of the vehicle. That is, the larger thickness of the element 30 in the vehicle forward direction tends to lead to more light loss in the vehicle forward portion of the element 30, resulting in more light intensity in the scattered light pattern 44 that emanates from the element 30 in the vehicle rearward direction.

Still referring to FIGS. 4-4C, the light-diffusing element 30 of the light assembly unit 100' can further include a protective film 50 disposed over the surface of the element 30. The protective film 50 has an interior-facing surface 28 facing the interior 3 of the structure containing the unit 100' and an exterior-facing surface 26 facing the light-diffusing element 30. Preferably, the protective film 50 has high optical clarity with substantial transparency. For example, the protective film 50 can include a scratch-resistant film (e.g., a fluorosilane coating) that is deposited directly onto the light-diffusing element 30.

Referring again to FIGS. 4-4C, the light assembly unit 100' can additionally be configured with edge seals 70 that are configured to seal the edges 36a, 36b, 36c and 36d of the light-diffusing element 30, light barrier 20 and protective film 50 (if present). In some aspects, the seal 70 is a thermoset, polymeric material that can be applied with a relatively low viscosity to seal these features (e.g., the light barrier 20, light-diffusing element 30 and protective film 50) before curing. In other aspects of the light assembly unit 100', the seal 70 is a thermoplastic material that is applied with a relatively low viscosity at an elevated temperature and cooled to seal these features. In certain embodiments, the seal 70 can be formed over these features of the light assembly unit 100' to provide a hermetic and corrosion-resistant seal over them.

Referring again to FIGS. 4-4C, the light assembly unit 100' is provided that includes, among other features, a plurality of LED sources 40a, 40b, 40c and 40d that are configured along the corresponding edges 36a, 36b, 36c and 36d, respectively. In certain embodiments of the light assembly unit 100', the LED sources 40a-40d are spaced equally from one another along each of the respective edges 36a-36d. In other aspects of the light assembly unit 100', the LED sources 40a-40d are spaced with non-constant dimensions. For example, more LED sources 40a on a first opposed edge 36a could be concentrated toward a third opposed edge 36c in the vehicle rearward direction to increase the extent of the scattered light pattern 44 in the vehicle rearward direction to better encompass the rear passengers in a vehicle containing a dome light assembly 100 having such a light assembly unit 100'. Accordingly, the light assembly unit 100' can employ various quantities and combinations of LED sources 40a, 40b, 40c and 40d and spacings for these sources, depending on the dimensions of the edges 36a, 36b, 36c and 36d, along with other considerations regarding the desired location(s) of the scattered light 44 that emanates from the unit 100' into the interior 3 of the vehicle 1 or other structure housing the unit 100'.

With further regard to the light assembly unit 100' depicted in exemplary fashion in FIGS. 4-4C, the shape factor of the various components of the unit 100' can change depending on the application for the unit 100' and the light assembly 100 that incorporates the unit 100'. For example, the light assembly unit 100' could take on a circular, elliptical, triangular, rhombohedral, or another irregular shape. Accordingly, certain implementations of the light assembly unit 100' will have a plurality of LED sources (e.g., LED sources 40a, 40b, 40c, 40d, etc.) along the edge(s) of any such shapes. In other aspects, the LED sources 40a, 40b, 40c and/or 40d could be mounted in proximity to the edges of such shapes without touching them (e.g., hide them from view within the structure of a roof 200 in a vehicle 1 as shown in FIG. 1).

Referring now to FIG. 4C, the light assembly unit 100' in certain embodiments can include a light-diffusing element 30 with one or more tapered facets 60 cut at a tapered cut angle 62 with respect to the light barrier 20. These facets 60 can be installed within the light-diffusing element 30 to further control incident light 42 from the plurality of LED sources 40a-40d (see also FIG. 4). In certain aspects, the facets 60 are simple cuts made through the light-diffusing element 30 to change the local index of refraction within the element at the location of the facet. In particular, the facets 60 can prevent incident light 42 emanating from a set of LED sources, e.g., sources 40b,d from reaching across the complete element 30. For example, incident light 42 from LED source 40b directed at an edge 36b that emanates through the light-diffusing element 30 without scattering off of the scattering sites 80 (see FIG. 4B) can be directed away from the opposing edge 36d by reflecting off of the tapered facets 60. In certain embodiments, the tapered facets 60 are installed at a tapered cut angle 62 that ranges from 0 to 90 degrees (e.g., as including a vertical and a horizontal facet 60), preferably from 30 to 60 degrees, and even more preferably, between 40 and 50 degrees. In other implementations, the tapered facets 60 are configured to span less than the full thickness of the light-diffusing element 30, particularly for embodiments in which at least some incident light 42 is intended to scatter across the full width and/or length of the element 30.

Figure 5:
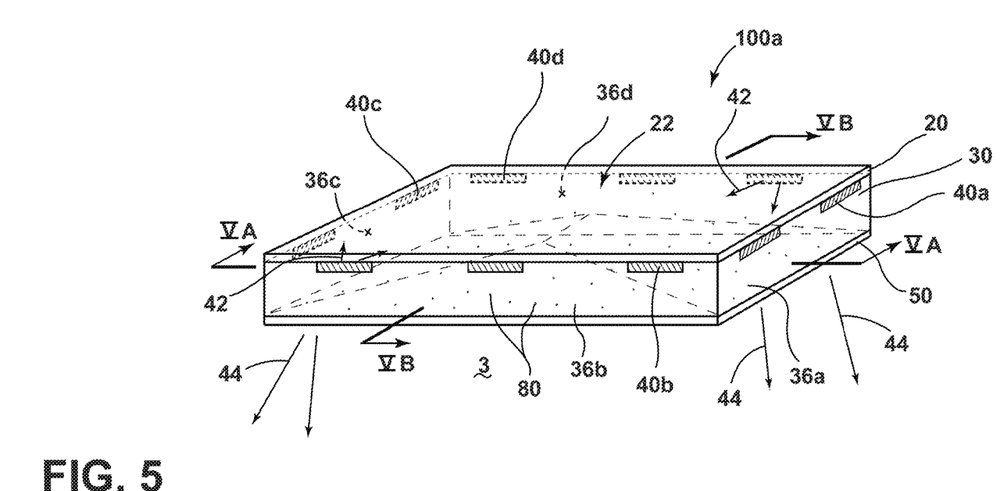
FIG. 5 is a perspective view of a light assembly unit employing a plurality of LED sources and a light-diffusing element with a central region having a smaller thickness than its edges according to an embodiment.
Figure 5A:
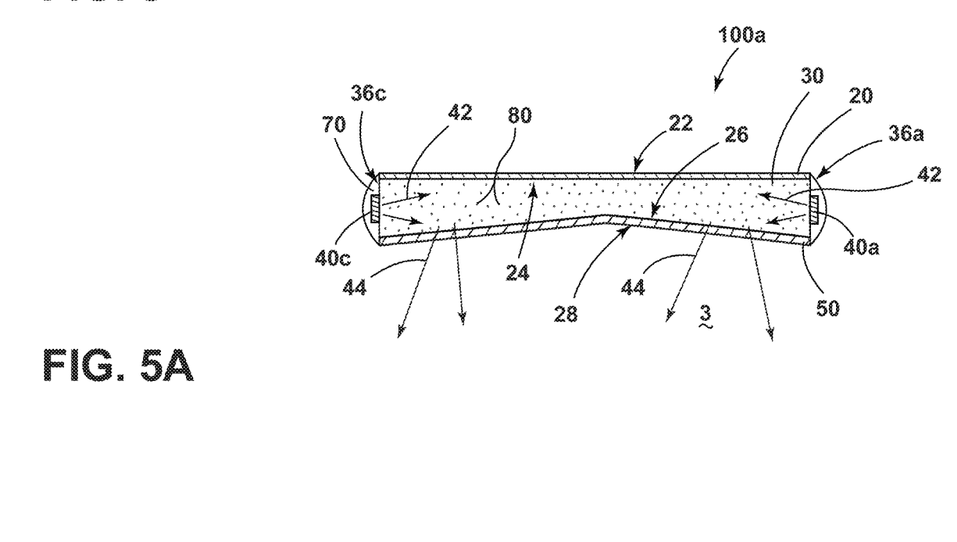
FIG. 5A is a cross-sectional view through the width of the light assembly unit depicted in FIG. 5.
Figure 5B:
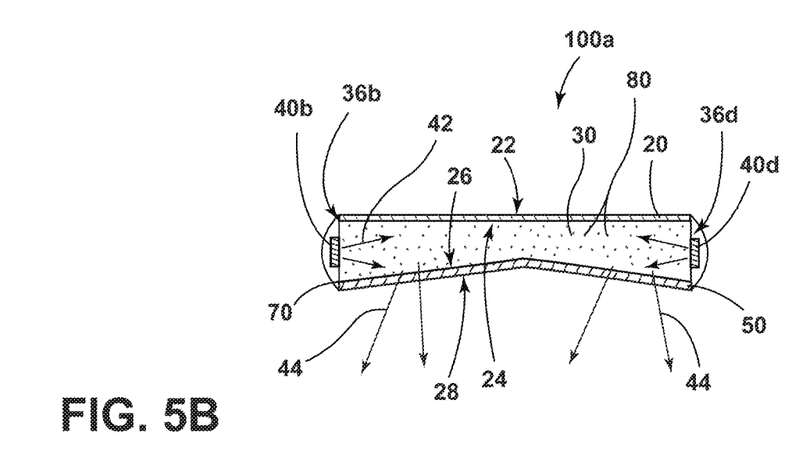
FIG. 5B is a cross-sectional view through the length of the light assembly unit depicted in FIG. 5.
Figure 5C:
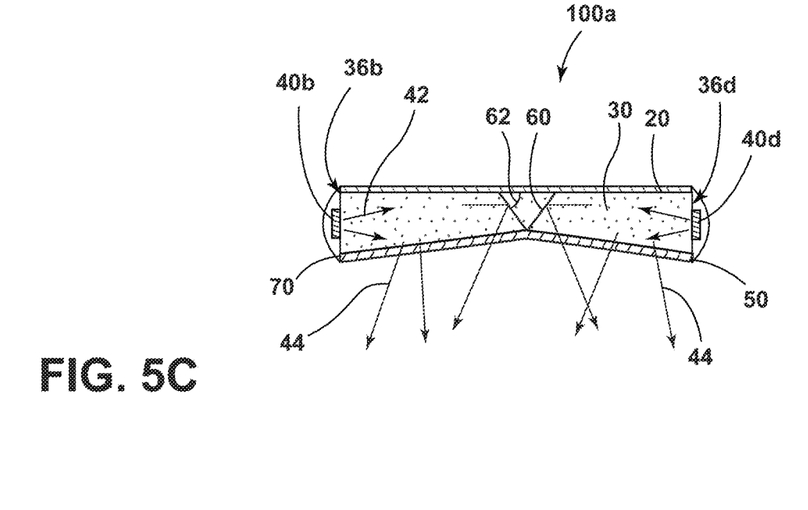
FIG. 5C is a cross-sectional view through the length of the light assembly unit depicted in FIG. 5 with a pair of facets in its light-diffusing element according to a further embodiment.

Now referring to FIGS. 5-5C, a light assembly unit 100a is provided that includes a light barrier 20 having a reflective interior-facing and an exterior-facing surface 24, 22, respectively. The light assembly unit 100a further includes a light-diffusing element 30 over the barrier 20 having first and second opposed edges 36a, 36c, along with third and fourth opposed edges 36b, 36d. In addition, the light assembly unit 100a includes a plurality of LED sources 40a-40d configured to direct incident light 42 into the opposed edges 36a-36d. The light assembly unit 100a is similar to the light assembly unit 100' shown in FIGS. 4-4C and like-numbered elements have the same or similar functions and structures. The primary difference between the unit 100a and the light assembly 100' (see FIGS. 4-4C) is that the light assembly unit 100a has a tapered light-diffusing element 30 with a central region having a thickness that is smaller than the thickness of the edges 36a, 36b, 36c and 36d of the element 30. As such, each cross-section of the light assembly unit 100a shows that the thickness of the light-diffusing element 30 at the center point between the opposed edges 36a and 36c (FIG. 5A) and the center point between the opposed edges 36b and 36d (FIG. 5B) is smaller than the thickness of the element 30 at these edges.

Referring again to FIGS. 5-5C, an advantage of this configuration of the light assembly unit 100a is that it can be employed in a dome light assembly 100 (see FIGS. 1-3) to provide highly uniform light throughout the interior 3 of the vehicle 1. This capability is particularly advantageous for embodiments of the dome light assembly 100 that are configured to generally produce natural light patterns (e.g., light patterns 44) in the interior 3 of the vehicle 1 and/or produce such light patterns over particular region(s) of the vehicle (e.g., regions 202, 204, etc., as shown in FIG. 3). The smaller thickness of the light-diffusing element 30 at a central point away from each of the opposed edges 36a, 36b, 36c and 36d (i.e., as compared to the thickness of the element 30 at each of the opposed edges 36a-36d) serves to offset the higher degree of light loss associated with the incident light 42 at this location compared to other locations within the element 30. That is, light loss associated with the incident light 42 increases as a function of distance from the LED sources 40a-40d within the light-diffusing element 30, assuming a constant thickness of the element 30. By reducing the thickness of the element 30 along this same path toward the center point or central region of the element 30, the degree of light loss can be offset by the thickness reduction, leading to improved uniformity in the scattered light pattern 44 that emanates from the light-diffusing element 30 into the interior 3 of the structure containing the light assembly unit 100a.

Figure 6:
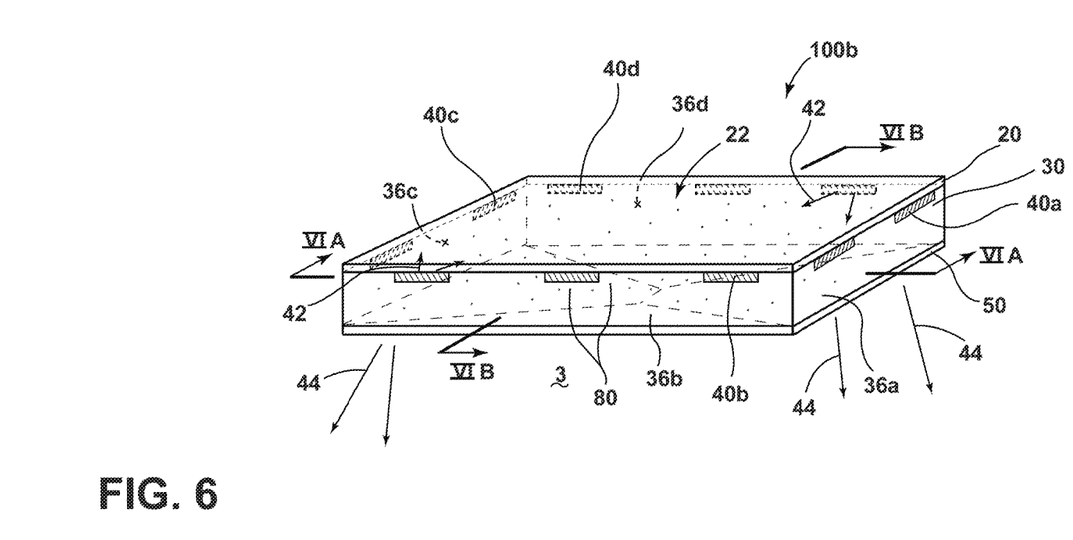
FIG. 6 is a perspective view of a light assembly unit employing a plurality of LED sources and a light-diffusing element with a central region having a larger thickness than its edges according to an embodiment.
Figure 6A:
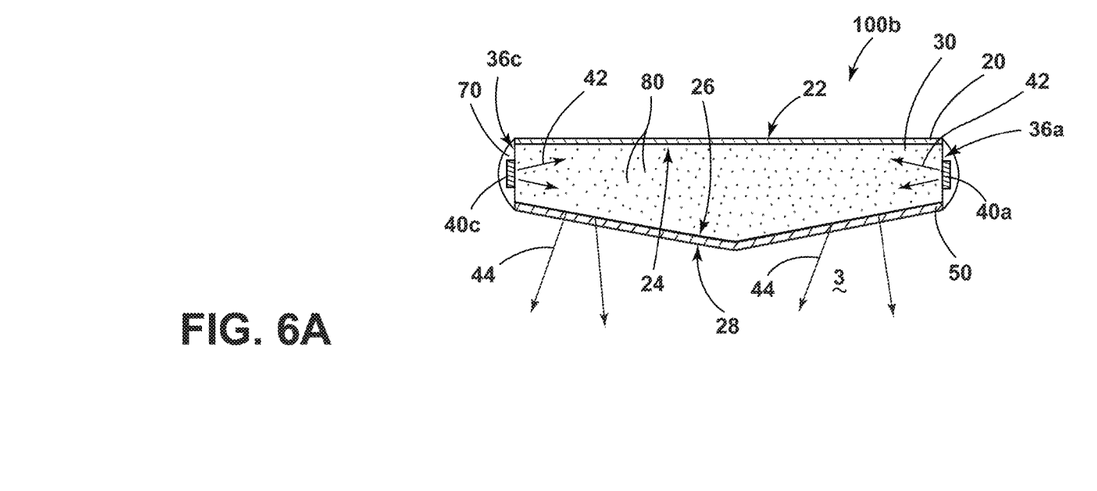
FIG. 6A is a cross-sectional view through the width of the light assembly unit depicted in FIG. 6.
Figure 6B:
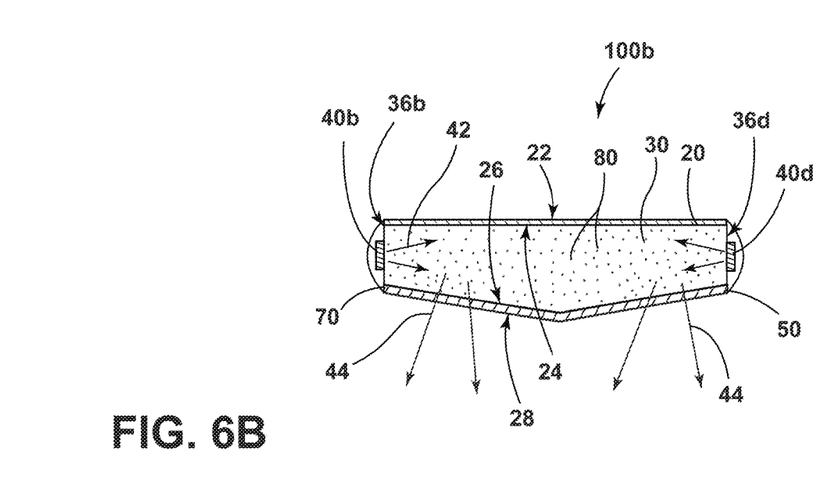
FIG. 6B is a cross-sectional view through the length of the light assembly unit depicted in FIG. 6.
Figure 6C:
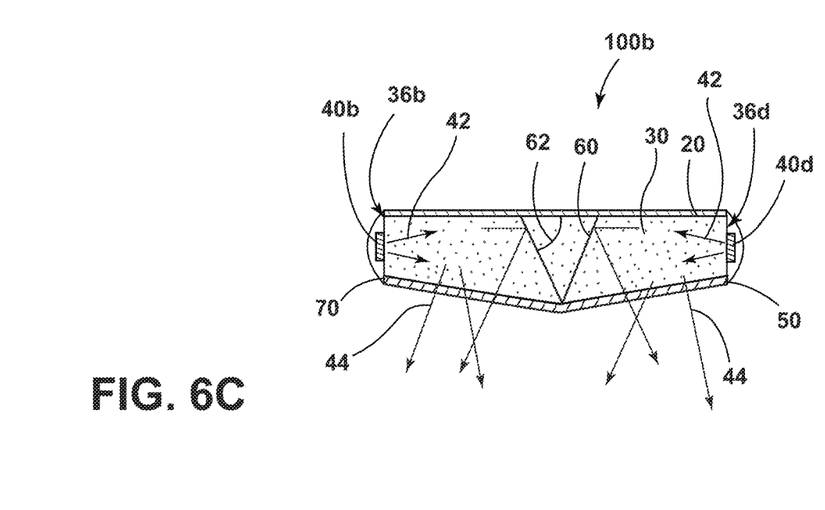
FIG. 6C is a cross-sectional view through the length of the light assembly unit depicted in FIG. 6 with a pair of facets in its light-diffusing element according to a further embodiment.

Now referring to FIGS. 6-6C, a light assembly unit 100b is provided that includes a light barrier 20 having a reflective interior-facing and an exterior-facing surface 24, 22, respectively. The light assembly unit 100b further includes a light-diffusing element 30 over the barrier 20 having first and second opposed edges 36a, 36c, along with third and fourth opposed edges 36b, 36d. In addition, the light assembly unit 100b includes a plurality of LED sources 40a-40d configured to direct incident light 42 into the opposed edges 36a-36d. The light assembly unit 100b is similar to the light assembly unit 100' shown in FIGS. 4-4C and like-numbered elements have the same or similar functions and structures. The primary difference between the unit 100b and the light assembly 100' (see FIGS. 4-4C) is that the light assembly unit 100b has a tapered light-diffusing element 30 with a central region having a thickness that is larger than the thickness of the edges 36a, 36b, 36c and 36d of the element 30. As such, each cross-section of the light assembly unit 100b shows that the thickness of the light-diffusing element 30 at the center point between the opposed edges 36a and 36c (FIG. 6A) and the center point between the opposed edges 36b and 36d (FIG. 6B) is larger than the thickness of the element 30 at these edges.

Referring again to FIGS. 6-6C, an advantage of this configuration of the light assembly unit 100b is that it can be employed in a dome light assembly 100 (see FIGS. 1-3) to provide more directional light away from the region immediately beneath the assembly 100 in the interior 3 of the vehicle 1. This capability is particularly advantageous for embodiments of the dome light assembly 100 that are configured to produce courtesy light patterns over particular region(s) of the vehicle (e.g., regions 202, 204, etc., as shown in FIG. 3). The larger thickness of the light-diffusing element 30 at a central point away from each of the opposed edges 36a, 36b, 36c and 36d (i.e., as compared to the thickness of the element 30 at each of the opposed edges 36a-36d) serves to enhance the higher degree of light loss associated with the incident light 42 at this location compared to other locations within the element 30. That is, light loss associated with the incident light 42 increases as a function of distance from the LED sources 40a-40d within the light-diffusing element 30, assuming a constant thickness of the element 30. By increasing the thickness of the element 30 along this same path toward the center point or central region of the element 30, the degree of light loss can be enhanced by the thickness increase, leading to increased intensity in the scattered light pattern 44 that emanates from the light-diffusing element 30 into the interior 3 of the structure containing the light assembly unit 100b toward various regions within the interior 3 of the vehicle away from a region directly beneath the dome light assembly 100 containing such a unit 100b.

Dome light assemblies 100 (see FIGS. 1-3) containing light assembly units 100', 100a and 100b (see FIGS. 4-6C) can also possess outer curvature or other exterior shape factors in addition to a flat, parallel outer surface. When these light assemblies 100 possess such curvature, each of the features of the assembly typically exhibit the same or similar curvature (e.g., light barrier 20, light-diffusing element 30, etc.). For example, a dome light assembly 100 can be integrated within a vehicle (e.g., vehicle 1 as depicted in FIG. 1) and configured with a curvature to match the exterior curvature of the vehicle at the location of the roof 200 (see FIG. 1), rear passenger side panels, or other location in the interior 3 of the vehicle housing the assembly 100.

According to certain aspects of the dome light assemblies 100 (see FIGS. 1-3) containing light assembly units 100', 100a and 100b (see FIGS. 4-6C), one or more edges of the light-diffusing element 30 can be configured with highly reflective, specular surfaces, coatings or treatments in a direction or directions facing one or more LED source or sources 40a-40d. That is, edges of the light-diffusing element 30 facing an LED source or sources 40a-40d can be configured with these reflective surfaces or treatments to ensure that light loss of incident light 42 from the LED source or sources 40a-40d is minimized through theses edges to further maximize the intensity and uniformity of the scattered light pattern 44.

Other embodiments of the dome light assemblies 100 (see FIGS. 1-3) containing light assembly units 100', 100a and 100b (see FIGS. 4-6C) are configured with various positional relationships between the LED sources 40a-40d and the edges 36a-36d of the light-diffusing element 30. Depending on the type of LED source employed for the LED source or sources 40a-40d, the incident light 42 can vary in terms of its spread or beam angle. Preferably, the distance between the LED sources 40a-40d is minimized to ensure that all or most of the incident light 42 enters the light-diffusing element 30 with minimal loss above and/or below the element 30. Nevertheless, other embodiments of the dome light assemblies 100 can be configured with a finite spacing between the LED sources 40a-40d and edges 36a-36d of the light-diffusing element 30 to minimize internal reflection of the incident light 42 off of the interior-facing surface 24 of the light barrier 20 to reduce light loss (and thus increase efficiency).

Referring again to dome light assemblies 100 (see FIGS. 1-3) containing light assembly units 100', 100a and 100b (see FIGS. 4-6C), these assemblies can be fabricated according to various methods and sequences. In one exemplary method, a light barrier (e.g., a vacuum-metallized film from Kurz serving as a light barrier 20) is formed with a vacuum metallization process within a mold, and then a light-diffusing element (e.g., a light-diffusing element 30 fabricated from an ACRYLITE® LED material) is insert-molded onto the barrier. After the light barrier and light-diffusing element are joined, an optical protective coating (e.g., a silane-based optical, scratch-resistant coating or film) can be applied to the interior-facing side of the light-diffusing element. Next, the substrate, light barrier and light-diffusing element can be sealed at the edges of the assembly with a silicone overmold or other type of sealing material. Upon completion of the sealing step, the completed dome light assembly 100 can be installed into a structure, vehicle (e.g., within the roof 200 of the vehicle 1 shown in FIG. 1), or other device, depending on its intended application.

According to another aspect of the dome light assemblies 100 (see FIGS. 1-3) containing light assembly units 100', 100a and 100b (see FIGS. 4-6C), the assembly can be configured to produce scattered light patterns 44 that extend outward to the exterior 2 of the vehicle 1 in proximity to its doors for a puddle or approach lighting-type functionality. For example, the controller 150 (FIGS. 1-3) can be configured to direct one or more of the LED sources 40a-40d to transmit scattered light patterns 44 from the light-diffusing element 30 into one or more regions of the interior 3 of the vehicle 1 (e.g., regions 202, 206, 208 and 212 adjacent to the doors of the vehicle as shown in FIG. 3) upon the opening of one or more doors of the vehicle 1. Such information can be conveyed to the controller 150 as a vehicle-related input 180 (FIG. 2) through conventional door sensors that are employed in vehicles. Based on the configuration of the light-diffusing element 30 (e.g., degree of tapering), the presence of facets 60 (FIGS. 5C and 6C), and location and quantity of the LED sources 40a-40d, the scattered light pattern 44 produced by the dome light assembly 100 can extend to the exterior 2 of the vehicle through the opening in the vehicle that results from one or more doors existing in an open position. Accordingly, a preferred embodiment of the dome light assembly 100 configured for a puddle or approach lighting-type functionality can employ the light assembly unit 100b (see FIGS. 6-6C). More particularly, the light assembly unit 100b can enhance the intensity of the scattered light pattern 44 directed away from a region immediately beneath the dome light assembly 100 and out into the exterior 2 of the vehicle 1 upon the opening of one or more doors of the vehicle.

Variations and modifications can be made to the aforementioned structures without departing from the concepts of the present disclosure. For example, the dome light assemblies 100 and light assembly units 100', 100a and 100b of the disclosure are not limited to traditional vehicular dome light applications. These assemblies could be installed within a panel or roof feature of a vehicle or other structure having an interior with the same or similar elements having the same or similar functions. That is, these dome light assemblies and light assembly units can be installed in a dwelling, building or other enclosure to provide natural and/or courtesy lighting type functionality. The inputs to the controller in such configurations may change, depending on the application, but the essential concepts of these dome light assemblies and light assembly units can be translated. For example, such light assemblies and units can be installed in a wall panel of a dwelling and can be configured to generate courtesy and/or natural light patterns based on manual inputs from occupants inside the dwelling and/or light sensors installed on the exterior of the dwelling. Such embodiments, and other embodiments understood by those with skill in the field within the scope of the disclosure, are intended to be covered by the following claims unless these claims by their language expressly state otherwise.

What is claimed is:

1. A dome light assembly, comprising:
a light barrier comprising a metallized reflective surface facing an interior;
a light-diffusing element over the reflective surface having a plurality of corresponding opposed edges and LED sources; and
a controller for directing the sources to transmit a natural light pattern from the element into the interior based at least in part on an environmental input,
wherein each source is configured to direct incident light into the corresponding edge.

2. The light assembly according to claim 1, wherein the light-diffusing element comprises an acrylic polymer matrix and light-diffusing particles.

3. The light assembly according to claim 2, wherein the interior is an interior of a vehicle, and further wherein the assembly is configured for mounting to a roof in the interior of the vehicle.

4. The light assembly according to claim 3, wherein the environmental input is ambient light from the sun on the exterior of the vehicle.

5. The light assembly according to claim 3, wherein the environmental input is ambient light from the sun on portions of the exterior of the vehicle, and further wherein the controller directs the sources to transmit natural light patterns from the element into a plurality of locations within the interior based at least in part on the input.

6. The light assembly according to claim 1, wherein the environmental input is selected from the group consisting of a moisture input, a weather input, an exterior light sensor input, a temporal input and a global positioning system input.

7. The light assembly according to claim 1, wherein the controller is further configured for directing the sources to transmit a vehicle-related light pattern from the element into the interior based at least in part on a vehicular input.

8. A dome light assembly, comprising:
a light barrier comprising a metalized reflective surface facing an interior;
a light-diffusing element over the reflective surface having a plurality of corresponding opposed edges and LED sources; and
a controller for directing the sources to transmit light patterns from the element at a plurality of locations within the interior,
wherein each source is configured to direct incident light into the corresponding edge.

9. The light assembly according to claim 8, wherein the light-diffusing element comprises an acrylic polymer matrix and light-diffusing particles.

10. The light assembly according to claim 9, wherein the interior is an interior of a vehicle, and further wherein the assembly is configured for mounting to a roof in the interior of the vehicle.

11. The light assembly according to claim 10, wherein the controller transmits light patterns from the element into a plurality of locations within the interior of the vehicle based at least in part on a manual input, and further wherein the plurality of locations comprises a plurality of passenger locations within the vehicle.

12. The light assembly according to claim 10, wherein the controller is further configured for directing the sources to transmit light patterns from the element into a plurality of locations outside of the vehicle upon a movement of one or more doors of the vehicle to an open position.

13. The light assembly according to claim 11, wherein the thickness of the light-diffusing element is tapered across the element between the opposed edges, and further wherein the thickness of the element at a central location between each of the opposed edges is greater than the thickness of the element at each of the opposed edges.

14. The light assembly according to claim 8, wherein the controller is further configured for directing the sources to transmit a vehicle-related light pattern from the element into the interior based at least in part on a vehicular input.

15. A dome light assembly, comprising:
a light barrier comprising a metallized reflective surface facing an interior;
a light-diffusing element over the reflective surface having a plurality of corresponding opposed edges and LED sources; and
a controller for directing the sources to transmit a plurality of light patterns from the element into the interior based at least in part on a plurality of inputs,
wherein each source is configured to direct incident light into the corresponding edge.

16. The light assembly according to claim 15, wherein the light-diffusing element comprises an acrylic polymer matrix and light-diffusing particles.

17. The light assembly according to claim 16, wherein the interior is an interior of a vehicle, and further wherein the assembly is configured for mounting to a roof in the interior of the vehicle.

18. The light assembly according to claim 17, wherein the plurality of inputs comprises ambient light from the sun on the exterior of the vehicle, and further wherein the plurality of light patterns comprises a natural light pattern.

19. The light assembly according to claim 18, wherein the controller transmits light patterns from the element into a plurality of locations within the interior of the vehicle based at least in part on a manual input, and further wherein the plurality of locations comprises a plurality of passenger locations within the vehicle.

20. The light assembly according to claim 19, wherein the thickness of the light-diffusing element is tapered across the element between the opposed edges, and further wherein the thickness of the element at a central location between each of the opposed edges is smaller than the thickness of the element at each of the opposed edges.

* * * * *